Figure 11:
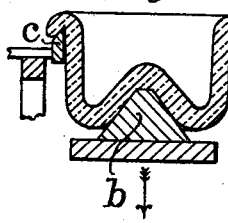

No. 703,618. Patented July 1, 1902.
P. T. SIEVERT.
METHOD OF PRODUCING HOLLOW GLASS BODIES.
(Application filed Mar. 21, 1902.)
(No Model.) 2 Sheets—Sheet 1.
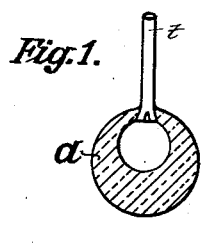
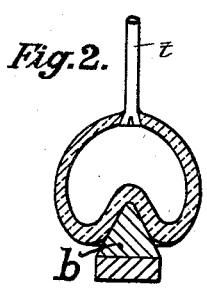
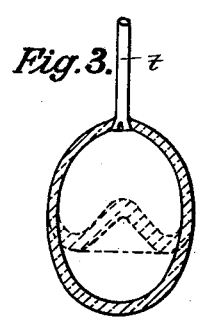
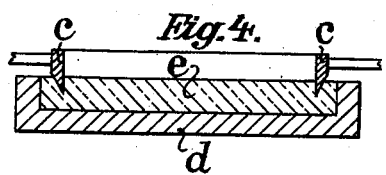
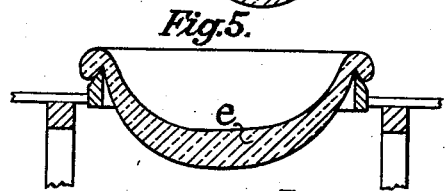
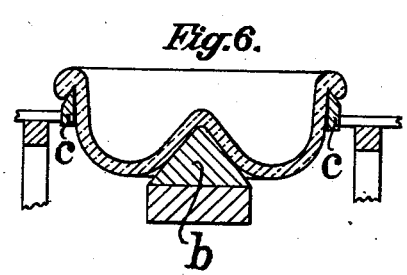
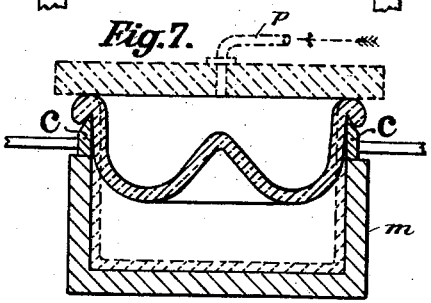
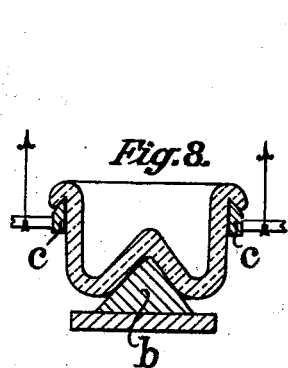
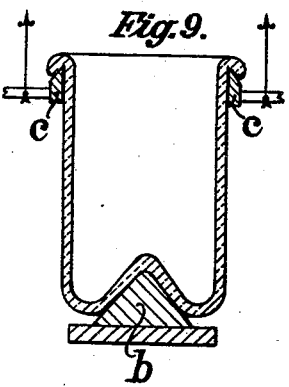
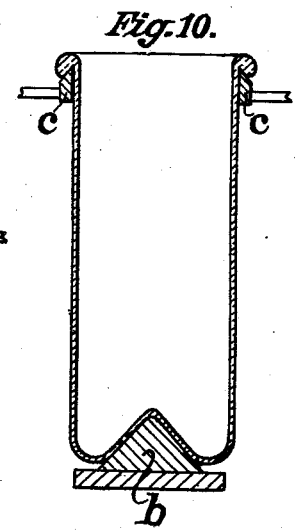
Witnesses:
Henry Thieme
George Barry Jr
Inventor
Paul Theodor Sievert
by attorneys
Brown & Seward No. 703,618. Patented July 1, 1902.
P. T. SIEVERT.
METHOD OF PRODUCING HOLLOW GLASS BODIES.
(Application filed Mar. 21, 1902.)
(No Model.) 2 Sheets—Sheet 2.

Witnesses:
Henry Thieme
George Barry Jr.

Inventor:
Paul Theodor Sievert
by attorneys
Brown & Seward

UNITED STATES PATENT OFFICE.

PAUL THEODOR SIEVERT, OF DRESDEN, GERMANY.

METHOD OF PRODUCING HOLLOW GLASS BODIES.

SPECIFICATION forming part of Letters Patent No. 703,618, dated July 1, 1902.

Application filed March 21, 1902. Serial No. 99,323. (No specimens.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in the Methods of Producing Hollow Glass Bodies, of which the following is a specification.

In the manufacture of hollow glass bodies it is generally essential that besides giving the body the desired shape an equal or uniform distribution of the glass mass throughout all parts of the body should be effected—that is to say, that the wall or walls and the bottom shall have a uniform or, as nearly as possible, a uniform thickness. This uniformity is sometimes difficult to obtain.

In producing hollow glass bodies by the blowing process performed through the mouth-tube the equal distribution depends upon the skill of the glass-blower, who by means of sagging, turning, and swinging and by repeatedly reheating the glass distributes throughout the body the glass which naturally tends to accumulate at its bottom or bulged-out end.

In producing hollow glass bodies by the blowing process mechanically performed by an artificial elastic pressure medium this distribution depends, mainly, upon the action of the elastic pressure medium, sometimes on such action assisted by the sagging of the glass by its own weight; but that method of distributing accumulations in the glass mass is far from being satisfactory.

The present improvement is applicable in connection either with the mouth-blowing process, or with the mechanically-performed blowing process, or with the process of forming hollow bodies by allowing a plastic layer or mass of glass to sag by its own weight while supported at its edges; and the object of said improvement is to counteract or overcome the natural tendency hereinbefore mentioned to accumulation of the glass at the bottom or bulged-out end of the hollow body and to effect the distribution of such accumulations through other parts of said body. In the mouth-blowing process this improvement will allow the working with a more highly heated mass of glass than heretofore and the new method generally will enable bodies of very great size to be produced without reheating—that is to say, in one heat—either by blowing or by permitting the simple sagging of the mass of glass in the open air or in molds, or by sagging and by blowing combined.

For the purpose of such distribution of glass, as hereinbefore mentioned, in the production of hollow glass bodies by the processes hereinbefore referred to my invention consists, essentially, in forming a temporary indentation into the bottom or bulged-out end or portion of the glass mass, layer, or blank which is under operation, at which bottom, end, or portion, as is well known, the greatest accumulation of glass takes place. Such indentation will cause a distribution of the accumulated glass into the walls of such indentation or in a lateral direction. This temporary indentation may be made by allowing the mass, layer, or blank to settle on a properly-shaped core, upon which the plastic glass in its accumulated thickness shapes itself, and thus distributes said accumulation of the glass. When this indentation has taken place, the mass, layer, or blank is lifted from said core, when the indentation which has been thus created will afterward bulge out downwardly, and the mass, layer, or blank being thus again rounded off at its lower portion is or may be either in the open air or in a mold further treated by simply allowing it to sag by its own weight or by so allowing it to sag and at the same time blowing it out as to cause or permit it to attain the desired final shape. This final shaping of the mass or blank may, however, also be effected while the said mass or blank still rests on the said core by drawing upward the tool or implement to which the said mass or blank is attached for sagging, or for both sagging and blowing, or the said shaping may be effected while said tool or implement rests stationary by lowering the core, or it may be effected by drawing upward said tool or implement while simultaneously the said core is lowered. In all these cases the plastic mass of glass finds its support upon the indenting-core, and by the removal or distribution of the excess accumulation of glass at the bottom of the mass or blank by means of the said core a uniform distribution of the mass of glass into the bottom or into the sides of the body to be formed is caused.

Figure 14:
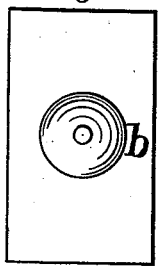
Figure 15:
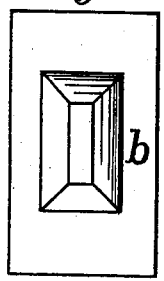
Figure 16:
Figure 17:
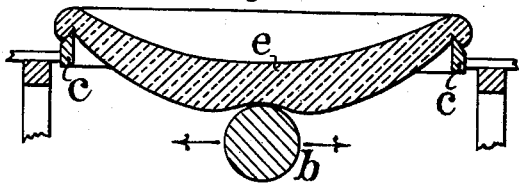
Figure 18:
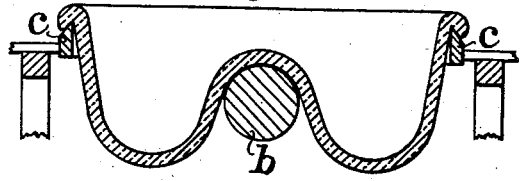
Figure 19:
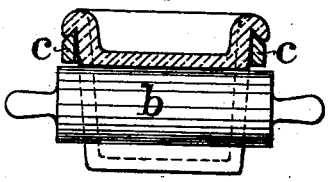

Figures 1 to 13 are vertical sectional views, which will be hereinafter described in detail in their regular order, illustrating the process as performed by the mouth-blowing, by the mechanical blowing, and by the blowing and sagging operation combined. Figs. 14, 15, 16 are plan views of cores of different forms for producing the indentation in the glass mass, layer, or blank. Figs. 17 and 18 are vertical sectional views illustrating two stages of the operation performed by the blank shown in Fig. 16; Fig. 19, a vertical sectional view at right angles to Fig. 18.

In Figs. 1, 2, 3, $t$ represents the glass-blower's mouth-tube. In Fig. 1 a mass of molten glass $a$ is shown as picked up on the said tube and partly blown out in bulb form. Fig. 2 illustrates the further blowing out of a bulb while it is supported at its bottom or most protuberant bulged-out portion on a core $b$ of conical form, by which there is formed into it an indentation, and there is produced a stretching of the bottom which increases its area and causes a uniform or nearly uniform distribution of the plastic mass of the glass and uniform or nearly uniform thickness of the bottom and sides of the hollow body produced by the blowing. Fig. 3 represents the blown-out hollow body after the removal or withdrawal of the core $b$ and after the sagging down and bulging out of the portion of the body which has been stretched by the indentation produced by the core. After the body has arrived, as described, in the condition illustrated by Fig. 3 a final shaping of the body may be produced by a further sagging of the glass by its own weight or by blowing, or by both sagging or blowing, with or without the assistance of a mold.

In Figs. 4 to 7 the method of using a core $b$ for the purpose of this invention is illustrated in connection with the known process of forming a hollow glass body beginning with forming a layer of liquid glass $e$. When the spreading of such layer $e$ upon a plate $d$ has taken place and a frame $c$ has been applied and pressed into the liquid or plastic mass, as shown in Fig. 4, so as to take hold of it, and the frame and the glass have been turned upside down, the glass resting upon said frame $c$ will begin to sag within the latter, as shown in Fig. 5, and an accumulation of glass will take place in the bottom of the layer or blank. The said bottom is then caused to rest upon the core $b$, properly placed, as shown in Fig. 6, in relation to said frame $c$, so that an indentation or bulging in of the accumulation of glass is formed, the formation of such indentation causing a distribution of the accumulated glass into the walls of the indentation. After removing the piece or blank from the core or removing the core from the blank or piece the final shaping of the hollow glass body may be performed either by sagging or blowing in the open air or into a mold $m$, as shown in Fig. 7, in which is also shown in dotted lines a pipe $p$ for the admission of an elastic pressure medium. In all these cases the indentation caused by the core will afterward bulge out and the hollow glass body will shape with a bottom of a thickness in correspondence with the thickness of the walls.

The method as illustrated in Figs. 8 to 13 starts from the same initial formation of the hollow glass body by forming a flat layer of liquid glass and after the commencement of the formation of the piece or blank using a core $b$ for distributing the glass accumulation at the bottom. The first proceeding with this core in Fig. 8 corresponds to that illustrated in Fig. 6, with this modification: that the tool or implement which holds the piece or blank for the hollow body is made to be lifted up or elevated, so that while the core $b$ continues to be in contact with the glass bottom the hollow body is formed by being drawn in an upward direction.

Figure 12:
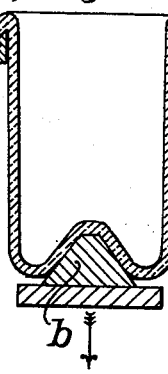
Figure 13:
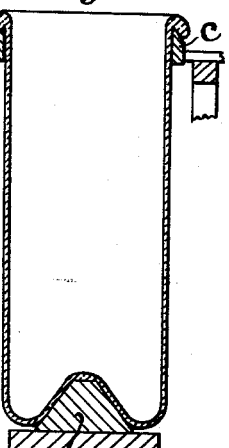

According to Figs. 11 to 13 the method is intended to be carried out so that the tool or implement holding the piece or blank remains stationary while the core $b$ is lowered down, thus causing the formation of the body by drawing the piece or blank in a downward direction. These two procedures—that is to say, the removal of the piece or blank in upward direction, according to Figs. 8 to 10, and the removal of the core in downward direction, according to Figs. 11 to 13—may be combined for drawing the piece or blank and distributing at the same time the accumulation of glass at the bottom, the indentation at the bottom being allowed to bulge out after removal of the core.

Of the several forms of the core $b$ shown in Figs. 14, 15, 16 which may be used, Fig. 14 is conical, Fig. 15 is pyramidal, and Fig. 16 cylindrical. Said core may, however, be of any desired shape or form.

In Figs. 17 to 19 the new method of distributing the glass at the bottom of the piece or blank is shown with the use of a core $b$ of cylindrical shape according to Fig. 16. Such a core will prove to be very useful for the method of distributing glass in the manufacture of hollow glass bodies of considerable size—such, for instance, of glass bath-tubs. After the layer of glass $e$, carried by frame $c$, has been brought into position and condition, as illustrated in Fig. 17, the core $b$ is brought into the position illustrated and is rolled or moved to and fro below the glass layer, which is supported by said core, in order to cause the uniform distribution of the glass accumulation while the piece or blank is continuously sagging. After removal of said core the piece or blank is subjected to the final blowing operation in a mold, thereby receiving a thickness of the bottom corresponding to the thickness of the walls.

What I claim as my invention is—

1. The herein-described improvement in the process of producing hollow glass bodies, which consists in first obtaining a partly-formed hollow body from a mass of liquid glass and afterward while said body remains plastic distributing an undesirable accumulation of glass which may occur in any part of said partly-formed body by producing an indentation thereinto from the exterior thereof, and finally allowing the indentation to bulge outward.

2. The herein-described improvement in the process of producing hollow glass bodies, which consists in first obtaining a partly-formed hollow body from a mass of liquid glass, next for the purpose of distributing such undesirable accumulation of glass as may occur in any part of said partly-formed body, producing an indentation into such part thereof from its exterior and allowing the glass while still plastic to sag at the sides of such indentation, and finally allowing the said indentation to bulge outward.

3. The herein-described improvement in the process of producing hollow glass bodies, which consists in first obtaining a partly-formed hollow body from a mass of liquid glass, next for the purpose of distributing such undesirable accumulation of glass as may occur in any part of said partly-formed body, producing an indentation into such part thereof from its exterior and at the same time blowing said body from its interior, and finally bulging out the so-indented part by continued blowing.

In testimony that I claim the foregoing as my invention I have signed my name, in presence of two witnesses, this 8th day of March, 1902.

PAUL THEODOR SIEVERT.

Witnesses:
HERNANDO DE SOTO,
PAUL ARRAS.